United States Patent Office 3,034,535
Patented May 15, 1962

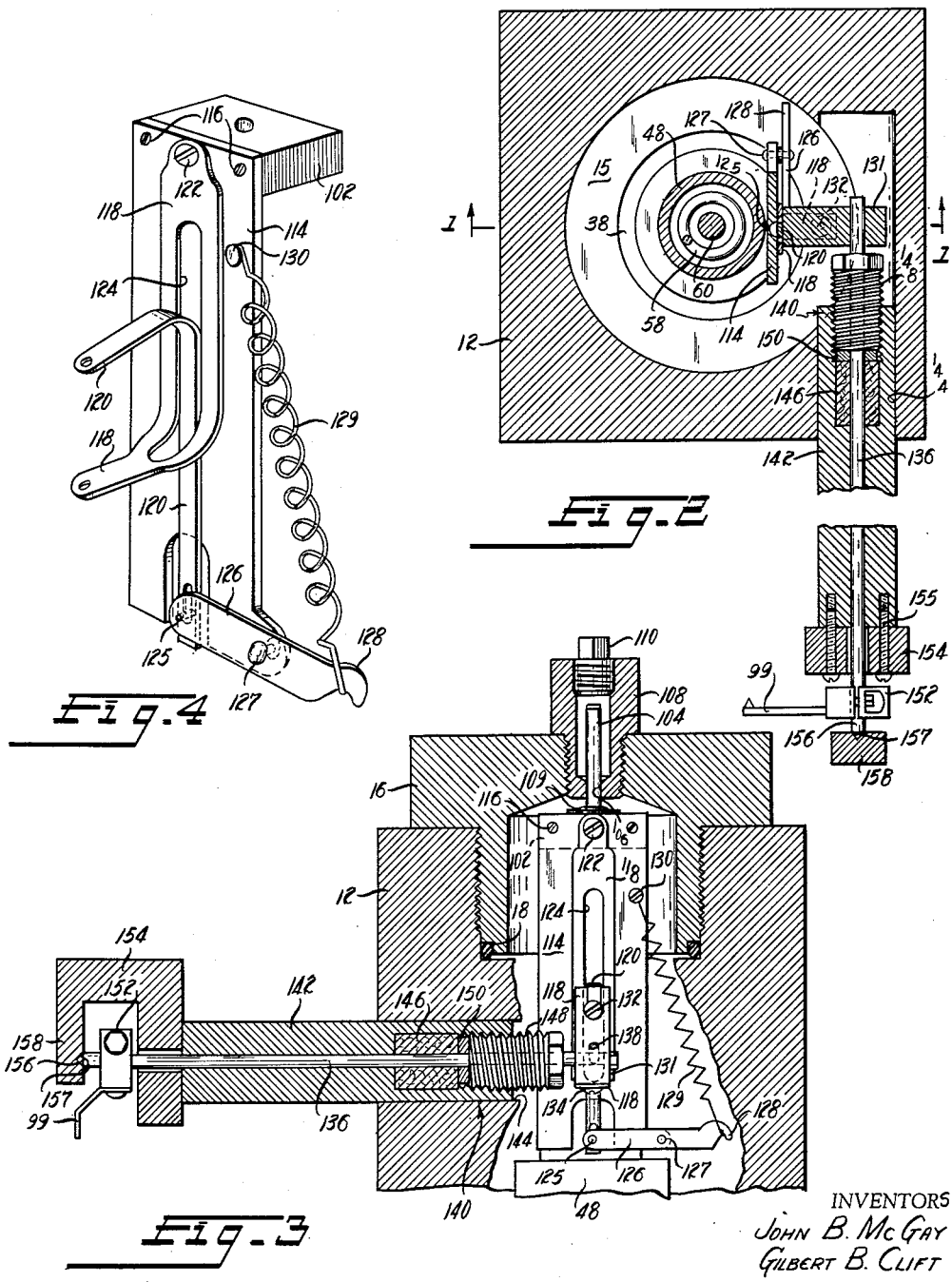

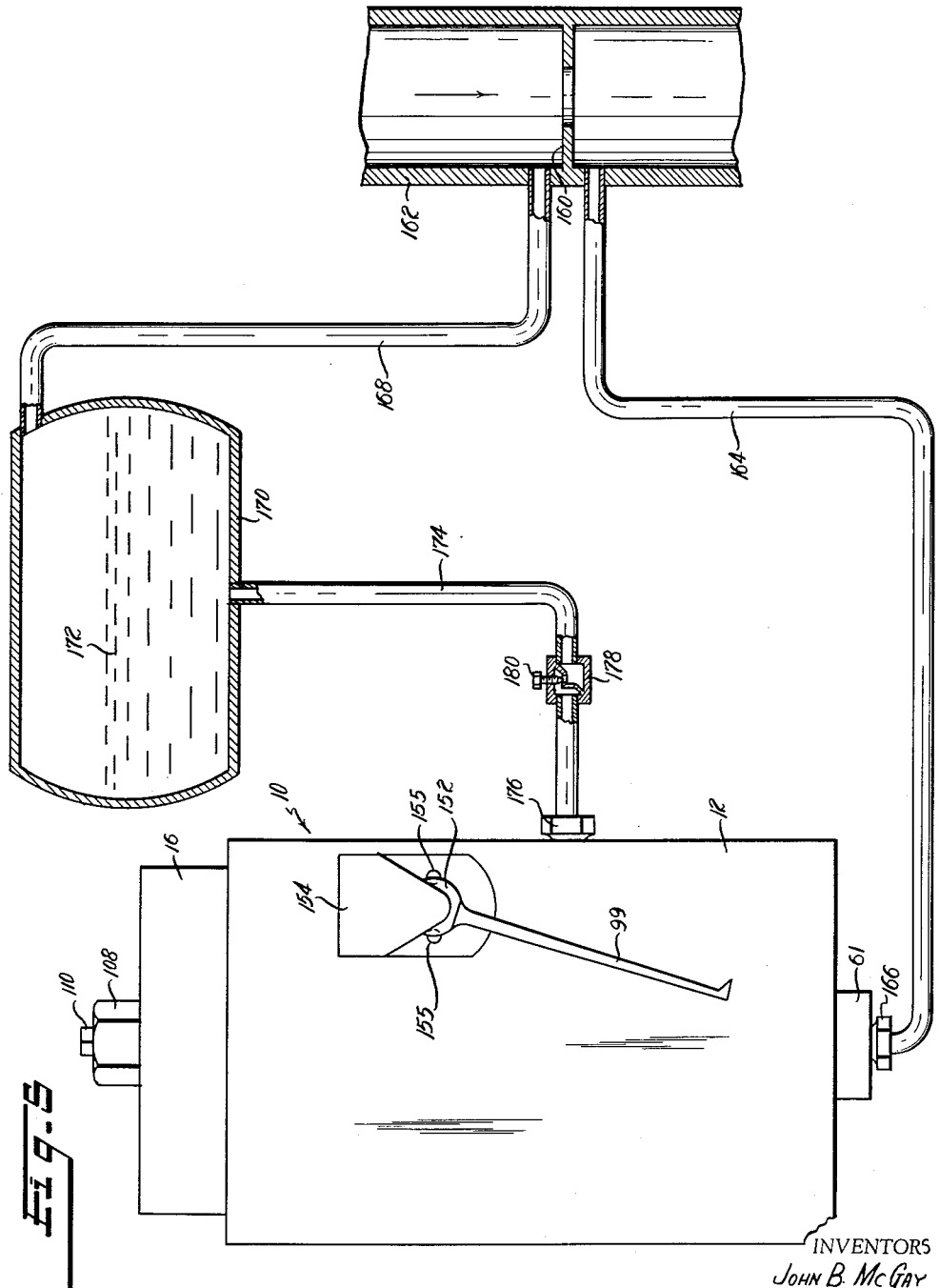

3,034,535
FLUID PRESSURE SENSITIVE DEVICE
John B. McGay and Gilbert B. Clift, Tulsa, Okla., assignors to Rockwell Register Corporation, Bellefontaine, Ohio, a corporation of New York
Filed Dec. 17, 1956, Ser. No. 628,614
16 Claims. (Cl. 137—790)

This invention relates to fluid pressure sensitive devices, and more particularly to pressure or differential pressure sensitive devices operable to indicate, record or control in accordance with the value of such pressure or pressure differential.

The fluid pressure measuring devices presently in general use are of either bellows or mercury manometer type, and there are practical objections to each of these types. The metallic bellows commonly employed in bellows type instruments are subject to metallic fatigue causing eventual rupture, thus necessitating frequent replacement of the bellows. Mercury for manometric use is expensive in first cost and replacement, and its tendency to amalgamate with other metals and to react chemically with the fluids being measured often proves troublesome.

The prior art also includes many pressure measuring instruments of the diaphragm type, but to our knowledge none have found wide acceptance, primarily because they have not provided requisite accuracy of measurement, ease of adjustment and long service life. Among the principal causes of measurement inaccuracy in the prior diaphragm type instruments were change in "zero" position of the diaphragm with changes made in the tension of diaphragm biasing springs to obtain full scale deflection at desired differential pressure value, and errors introduced by lost motion and frictional drag in the indicating mechanism which is connected to the diaphragm to provide the necessary externally visible reading or control function. Still other errors are introduced by the springs commonly used to couple the measurement indicating mechanism to the diaphragm, since the force exerted by such springs modifies that exerted by the main biasing spring of the diaphragm.

Accordingly a primary purpose and object of the present invention resides in providing improved fluid pressure sensitive instruments which are not subject to these and other disadvantages of the prior devices and which are characterized by increased accuracy of pressure measurement over a relatively wide range of pressures, ease of adjustment to obtain desired sensitivity, simplicity of structure and economy of manufacture. While the invention as described is directed primarily to diaphragm type differential pressure sensitive devices, in certain of its aspects it is applicable to other pressure sensitive devices such, for example, as bellows or piston type differential pressure indicators and the like.

It is also an object of this invention to provide novel external adjustment means for changing the effective length of the diaphragm biasing spring without changing the relative zero position of the diaphragm, thus facilitating the calibration of the instrument to a fixed number of degrees of rotary motion for given values of applied differential pressure.

A further object of the invention is the provision of novel means for locking the diaphragm biasing spring adjustment mechanism in calibrated position from outside the indicator housing, and also the provision of novel housing structure which minimizes the number of fluid seals.

A further important object of this invention resides in the provision of new and improved means for obtaining accurate measurement of differential pressures by applying the two pressures to opposite sides of a spring loaded movable wall member provided with means for indicating the resultant movement of the member against its spring.

It is another object of the invention to provide new and improved pressure responsive devices wherein a diaphragm assembly is entirely free to move against its biasing spring with the meaturement indicating mechanism following it, and also to provide such a device wherein the lineal motion of the diaphragm assembly is translated into rotary motion of the measurement output means by means of a novel guide bar, sector and tape arrangement in which lost motion and frictional drag are reduced to a minimum.

Still another object is to provide novel means for damping flow line pressure fluctuations in gas flow rate measurement installations by means of a seal pot and metering valve interposed in one of the pressure lines to the measuring device.

It is also an object to provide a new and improved differential pressure indicator wherein by merely changing the value of the pressure differential opposing spring the same instrument may be used for a number of ranges of differential pressure.

These and other objects, features and advantages of the invention will become more fully apparent by reference to the appended claims and the following detailed description when read in conjunction with the accompanying drawings, wherein:

FIGURE 2 is a sectional view taken substantially on the line 2—2 of FIGURE 1;

FIGURE 3 is a sectional view taken substantially on the line 3—3 of FIGURE 1;

FIGURE 4 is a detail view of the diaphragm follower assembly of the device of FIGURES 1–3; and FIGURE 5 is a side elevation of the pressure sensitive device of FIGURE 1, shown as connected for gas flow rate measurement with an orifice tube and surge damping means in accordance with the invention.

Figure 1:
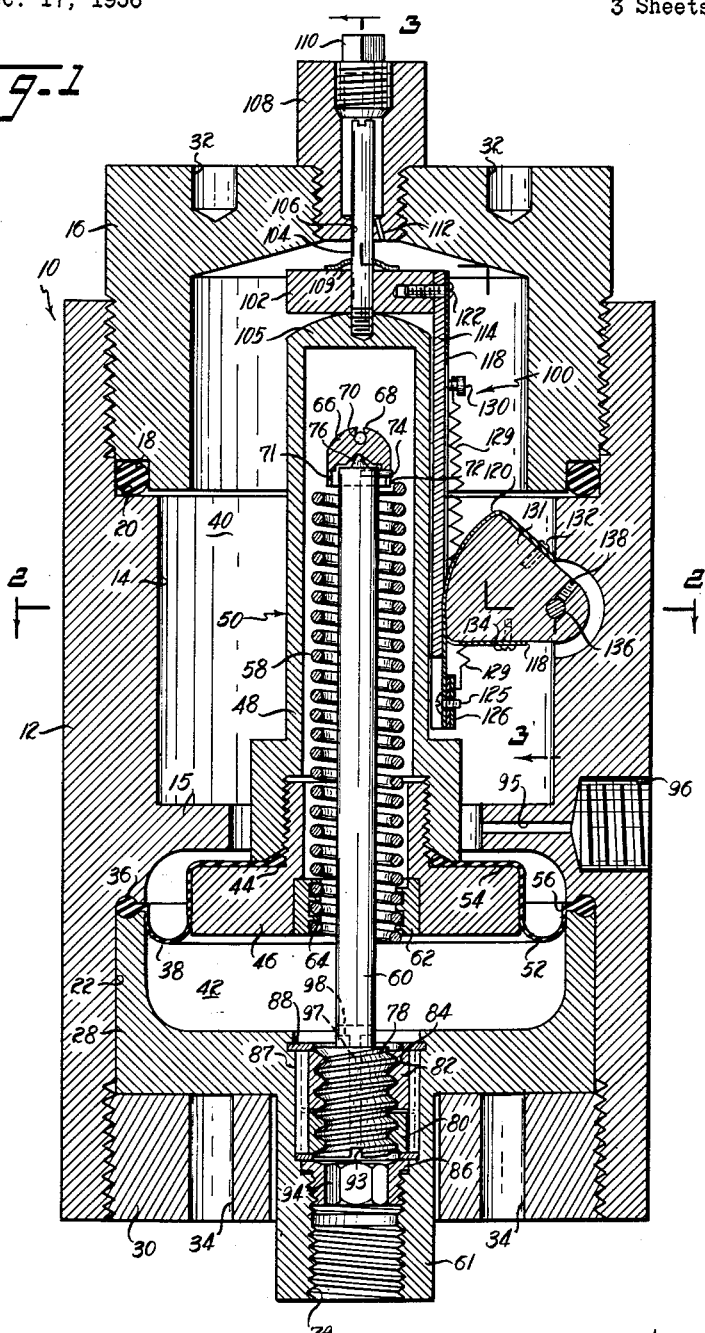
FIGURE 1 is a sectional view of a pressure sensitive device in accordance with the present invention, taken substantially on the line 1—1 of FIGURE 2.

With continued reference to the drawings, wherein like reference numerals are used throughout to designate like elements, the pressure sensitive device selected for illustration is a differential pressure indicator adapted for use in flow rate measurement using an orifice or venturi tube and for use in other applications wherein it is desired to measure and/or record pressure differentials or actuate control mechanism in accordance therewith. By "pressure differentials" is meant the difference between any two fluid pressures, either of which may be above or below atmospheric pressure or itself be atmospheric pressure.

In FIGURE 1, the differential pressure indicator designated generally by reference numeral 10 is illustrated as being housed in a casing 12 which is preferably a forging although it may be otherwise formed as by machining from bar stock. Casing 12 is hollow and has a generally circular bore 14 extending centrally downward from its upper end to an intermediate apertured wall member 15 formed integrally with the casing. Bore 14 is closed at its upper end by a threaded closure member 16 which seals against an O-ring 18 seated on an annular shoulder 20 formed at the base of the threaded end of bore 14. The lower portion 22 of hollow casing 12 opens into the upper bore 14 through the apertured wall member 15, and at its outer end is closed by a second closure member 28 firmly clamped in the casing 12 as by a retainer ring 30 threaded into the portion 22 of bore 14.

If desired, the top closure member 16 and lower retainer ring 30 may have holes 32 and 34, respectively, so disposed therein as to accommodate a suitable wrench for screwing the closure member and retainer ring into and out of casing 12.

The lower end closure member 28 seals against a bead 36 formed integrally with the periphery of a flexible diaphragm 38 which isolates fluid pressure chambers 40 and 42. A similar bead 44 formed about a central aperture in the diaphragm 38 seals a threaded joint between an elongated thimble member 48 and a support ring 46 which together constitute a center support and thrust member assembly 50 for diaphragm 38. The dimensions of the casing and diaphragm support member grooves, in which these diaphragm beads are received preferably are such that the beads are compressed an amount sufficient to provide fluid sealing in a manner similar to that characteristic of conventional O-ring seals.

The basic principle of this diaphragm construction and cooperation with the chamber structure constitute a portion of the invention disclosed and claimed in copending application Serial No. 626,229, filed December 4, 1956 by John B. McGay. It is described herein for purposes of disclosing an operable structure utilizing the invention in this application and, other than its novel use in combination with the spring adjustment and motion transmitting structure hereinafter described, does not constitute a part of this joint invention.

Diaphragm 38 may be plastic or rubber, natural or synthetic, and may be molded in shape. As shown, the diaphragm 38 has a relatively thin membrane portion 52 which is of U-section between its peripheral edges 54 and 56 on which are formed the beads 44 and 36, respectively. The U-shaped fold in diaphragm 38 permits full travel of the diaphragm and its center support assembly 50 without stretching the material of the diaphragm and without substantial change in the effective area thereof.

For substantially constant diaphragm effective area, the dimensions of the diaphragm and of the U fold therein, and the location of diaphragm clamping beads 36 and 44 vertically with respect to each other, should be such that the U-fold is of substantial depth and includes portions lying substantially flat against both the peripheral surface of ring 46 and the opposed surface of end closure 28, in all positions of the diaphragm and its center support throughout the full range of travel thereof. This assures that the low points of the freely depending U portion of the diaphragm remain a substantially constant distance from the diaphragm center line and accordingly, that the circumferential line made up of such low points remains of substantially constant diameter. Since the fluid pressure differential effectively acts on a diaphragm area which is proportional to the diameter of this circumferential line, by maintaining the diameter thereof constant it thus is possible to assure that the effective area of the diaphragm remains substantially constant at all diaphragm positions throughout its full range of movement. Thereby, the need for complex mechanism, as frequently resorted to in prior devices for compensating for changes in diaphragm effective area, is obviated.

While diaphragm 38 should be substantially inelastic at least to fluid pressures within the normal operating ranges of the instrument, the diaphragm may, if desired, be made of material having sufficient elasticity that, if the diaphragm is subjected to pressure differentials substantially greater than those which the instrument was designed to measure, the diaphragm after moving to the limit of its travel will then balloon into and seal against the walls of the lower pressure chamber without rupturing.

Thus, as the differential of the pressure in chamber 40 over the pressure in chamber 42 increases, diaphragm 38 and its center support assembly 50 will move downwardly until the ring 46 of assembly 50 seats on the upper surface of end closure 28, then if the pressure differential continues to increase the diaphragm will balloon down into and fill the annular space between the vertically disposed walls of ring 46 and closure 28. Since the extent of this ballooning action is limited by the small size of the space between ring 46 and end closure 28, there is little possibility of diaphragm rupture and the diaphragm is not stretched beyond a point where it will not return to original size and shape on release of pressure. Similarly, should the pressure in chamber 42 become excessive in relation to that in chamber 40, the diaphragm then will move up and close off against casing wall member 15.

The diaphragm 38 and its center support assembly 50 move in response to differential pressures as modified by a biasing spring 58 connected at its opposite ends to ring member 46 of the diaphragm support assembly 50 and to one end of a spring support rod 60 the other end of which is adjustably fixed in a central tubular hub 61 integral with the casing lower end closure member 28, in a manner later to be described.

A bushing 62, press-fitted or otherwise fixed in ring member 46 of diaphragm support assembly 50, is internally threaded with a thread 64 having a pitch less than the pitch of spring 58 when the spring is unstressed. Spring 58 therefore is slightly compressed by bushing thread 64 as the spring is screwed into the bushing, thus providing a more positive thread coupling between the spring and bushing.

The upper end of spring 58 connects to spring support rod 60 through a pivot socket element 66 carried by the rod 60 and riveted as at 68 over an eye 70 formed on the end of the spring. A downwardly extending flange 71 formed integrally with socket element 66 has a slot 72 cut therein through which extends a pin 74 fixed in the adjacent end of rod 60, for transmitting rotary motion of the rod to the socket element 66 and to the spring 58 riveted thereto at 68. A pivot point 76 on the end of support rod 60 engages in the pivot socket of element 66 to provide a pivotal connection between the rod and socket element which accommodates slight misalignment between parts and thus provides better freedom of movement.

The adjustably fixed lower end of spring support rod 60 has fixed thereon or formed integrally therewith an externally threaded member 78 having threads of the same pitch and same hand as spring 58. The tubular hub 61 of closure member 28 is provided with a threaded bore 79 and a counterbore 84. A pair of bushings 80 and 82, threaded to receive the threaded end member 78 of rod 60, are fitted in counterbore 84 in the closure member 28, over a shouldered and externally threaded locking ring 86 which extends from counterbore 84 into the threaded bore 79. Both bushings are held against rotational movement in the counterbore 84 by a key 87 seating in opposed slots cut in the wall of the counterbore and in bushings 80 and 82. The lower bushing 80 is preferably slightly smaller in diameter than counterbore 84 to assure freedom for limited vertical movement therein. The upper bushing 82 is fixed against rotary motion in the counterbore by key 87 and its upward axial movement is limited by a snap ring 88 disposed in a suitable annular groove in the end closure 28 above counterbore 84. When the threaded end member 78 of rod 60 is engaged in the two bushings, which are held against rotation by key 87, they will be axially spaced apart a slight distance as shown. Locking ring 86, screwed in threaded bore 79 of tubular extension 61 is provided with a central hex hole 94 into which a hex wrench may be inserted for screwing the lock ring upwardly against lower bushing 80 which squeezes the two bushings 80 and 82 together to clamp the threaded end member 78 of spring support rod 60 against further rotation in the bushings 80 and 82. The hex hole 94 also permits insertion of a screw driver or similar tool through lock ring 86 and into engagement with a kerf 93 cut in the lower end of spring support rod 60, for turning the rod when freed for rotation by loosening lock ring 86.

The spring support rod, bushing and lock ring arrangement just described permits ready adjustment of the effective length of biasing spring 58 to obtain the desired distance of travel of the diaphragm for each value of pressure differential applied across it. In adjusting the effective length of spring 58, a hex wrench is inserted in hex hole 94 of locking ring 86 and the ring backed off, thus releasing the pressure of bushings 80 and 82 on the threads of end member 78 on spring support rod 60. A screw driver is then inserted in kerf 93 in the end of rod 60 and the rod and its end member 78 rotated to shorten the effective spring length, the rod 60 and its end member 78 with attached spring 58 are rotated in a direction such that spring 58 is screwed downwardly through the threaded bushing 62 in diaphragm support ring 46. With the effective length of the spring 58 shortened a greater pressure differential across the diaphragm is required to obtain a given displacement. At the same time, the threaded member 78 on the lower end of support rod 60 is screwed downwardly through bushings 80 and 82 and thus lowers the vertical position of the support rod and the point of attachment of spring 58 thereto a distance just equal to that which the lower end of spring 58 was lowered by being screwed downwardly through bushing 62. Therefore, this adjustment results in a change in effective length of the spring 58 without accompanying changes in the zero position of diaphragm 38 and its center support assembly 50 and in the zero position tension of spring 58. The reverse procedure is followed if it is desired to increase the effective length of biasing spring 58, to obtain greater diaphragm travel for given applied pressure differential. In either case, lock ring 86 is again tightened against bushings 80 and 82 after the desired adjustment has been made, thus locking support rod 60 against rotation out of adjustment during service use of the instrument.

Fluid pressure lines may be connected into the pressure chamber 40 above diaphragm 38 by means of a radial passage 95 in fluid communication with a tapped bore 96 in casing 12 into which a pressure line fitting may be threaded, and into the pressure chamber 42 below diaphragm 38 by means of the tapped bore 79 in the tubular extension 61 of end closure 28. The space within end closure extension 61 is in open communication with pressure chamber 42 through an axial passage 97 and connecting radial passage 98 provided in the lower end of the spring support rod 60.

The fluid pressure inlet fitting arrangement just described obviates the need for any fluid seal about the adjustment mechanism 78—88 for spring support rod 60, thus avoiding the difficulty and expense of providing such a seal and eliminating all possibility of leakage from casing 12 about the support rod adjustment mechanism. The pressure line fitting (not shown) threaded into end closure extension 61 at 79 may readily be removed to expose the spring support mechanism for adjustment of effective length of the spring, which adjustment in normal service use is required only infrequently.

Turning now to the means by which the vertical movement of the diaphragm and its central support assembly is transmitted to measurement output means such as an externally visible pointer 99 (FIGURES 2 and 3) or other suitable indicating, recording or controlling mechanism, a diaphragm follower assembly indicated generally at 100 comprises a plate 102 which rests on the rounded top of the diaphragm support thimble 48 for up and down movement therewith, the rounded top of thimble 48 providing slight freedom in lateral movement between the plate and thimble. A guide stem 104 fixed in the upper closed end 105 of thimble 48 extends upwardly through an aperture in plate 102 and a guide aperture 106 formed in a bushing 108 threaded or otherwise fixed in upper end closure 16. Plate 102 is maintained on stem 104 and against the upper thimble end 105 by a speed nut fastener 109 pushed onto stem 104. Bushing 108 is closed by a plug 110, and its inner end is preferably provided with a small port 112 opening into the interior thereof to permit free movement of stem 104 into and out of the bushing without hydraulic block.

A guide bar 114 fixed to plate 102 as by screws 116 has attached thereto a pair of flexible ribbons 118 and 120 preferably of thin metal tape material and of configuration generally as shown in FIGURE 4. The upper ribbon 118 is fixed at one end to guide bar 114 as by a screw 122, and has an elongated slot 124 of width to permit the lower tape 120 to pass freely therethrough. Tape 120 has one end fixed as by a screw 125 to a tension lever 126 pivotally mounted intermediate its ends to guide bar 114 as at 127. The outer, free end of lever 126 is formed as a hook 128 which engages on end of a tension spring 129 the other end of which is anchored by a pin 130 to guide bar 114.

Ribbons 118 and 120 are attached by screws 132 and 134, respectively, to sector element 131, and are maintained under tension in tightly wrapped relationship to the sector element by tension spring 129. Sector 131 is fixed on a shaft 136 by a set screw 138 or other suitable means, and the shaft extends to the exterior of casing 12 through a stuffing box 140 formed in a tubular sleeve 142 brazed, threaded or otherwise secured in a bore 144 which extends through the side wall of casing 12 and opens into the casing interior. The shaft packing 146 or other fluid pressure seal is received within a counterbore within sleeve 142 and may be compressed therein as by a threaded gland 148 and gland follower 150.

Pointer 99 may be fixed to the other end of shaft 136 as by a split clamping ring 152 housed within a generally U-section shield 154 fastened to the outer end of sleeve 142 by suitable means such as the screws 155 shown.

The outer end 156 of shaft 136 is disposed in a pivot socket 157 in the outer leg 158 of U-section shield 154, the outer leg 158 of shield 154 serving as a thrust bearing and also serving to protect the pointer and shaft assembly against inadvertent damage as by persons working around the instrument. Both the pivot end 156 of shaft 136 and pivot socket 157 of shield leg 158 are hardened and polished, to decrease wear and friction.

Thus, pointer shaft 136 may be held in proper position in its mounting, and guide bar 114 properly positioned with respect to the sector 131 which is carried by shaft 136, by ribbons 118 and 120 both of which are attached to guide bar 114 and held in tightly wrapped relation about sector 131 by tension spring 129. Since sector 131 is fixed on shaft 136, positively coupled to ribbons 118 and 120 and held against guide bar 114 by the tension of the ribbons, there is no lost motion between rotation of the pointer shaft and reciprocation of the guide bar 114, and accordingly no lost motion error is introduced into the instrument reading. Since guide bar 114 and the plate 102, to which the guide bar is attached, must follow the movement of diaphragm center support assembly 50, because they are secured through stem 104 and speed nut 109, instrument readings will be free of error introduced by spring or other variable force connections between the diaphragm and movement indicating assemblies. And since the lower end of guide bar 114 is free except for its connection to sector 131 by tapes 118 and 120, the connection thus provided can compensate for small misalignments between parts caused by inaccuracies in manufacture and the like, thereby minimizing frictional drag in the diaphragm movement indicating assembly and the error in reading attributable to such drag.

The differential pressure indicator described in the foregoing is in use connected across a source of differential pressures, one of which may be atmospheric. Where the diaphragm biasing spring is a tension spring as described the higher of the two pressures is connected into chamber 40 through fitting 96 and the lower pressure is connected into chamber 42 through fitting 97.

The instrument may be calibrated to a fixed number of degrees of rotary motion of pointer 99 for each given differential pressure applied, this being done in steps of applying a reference pressure produced by a standard water column, for example, to the upper side of diaphragm 38 through fitting in the tapped bore 96. The lower side of the diaphragm is exposed to atmospheric pressure by removal of the pressure line fitting, if any, from end closure extension 61. Spring support rod 60 is then adjusted in the manner described above to obtain the desired pointer deflection for the pressure applied by the standard water column. Support rod 60 then is locked in adjusted position and the instrument connected into the pressure line or lines from a venturi or orifice meter fitting or other source of differential pressures, one of which may again be atmospheric.

If it is desired to adapt the instrument to use with differential pressures above or below the limits to which the diaphragm biasing spring 38 may be adjusted by its support 60, a stronger or weaker spring may be substituted to bring the instrument sufficiently within the desired pressure range that final calibration may be easily and accurately effected by adjustment of the spring support rod 60 as described.

This pressure measuring instrument can be used to measure and/or record static pressures by venting one side of the diaphragm, preferably the lower side, to atmosphere or to a standard reference pressure. The opposite side of the diaphragm would then be placed in fluid communication with the pressure to be measured.

With reference now to FIG. 5, the differential pressure indicator of the present invention is shown as set up for gas flow rate measurement using an orifice meter fitting 160 inserted in the gas flow line 162. The lower fluid pressure from fitting 160 is led by pressure line 164 directly to a fitting 166 threaded into the outer end of closure member extension 61, and thus is in direct communication with the pressure chamber below the diaphragm of indicator 10. The higher fluid pressure from fitting 160 is led by pressure line 168 into the top of a seal pot 170 which as shown is approximately half full of liquid 172 and is so positioned vertically with respect to indicator 10 that the liquid level within the tank is slightly above bushing 108 of indicator 10, to thus assure that the pressure chamber above the diaphragm of indicator 10 will be entirely filled with liquid through the line 174 connected into the indicator as by fitting 176.

A metering valve 178 inserted in liquid pressure line 174 includes a threaded needle element 180 adjustable to vary the resistance to liquid flow through the metering valve, to obtain a resistance to flow such as to damp out any rapid fluctuations in gas pressure communicated to the differential pressure indicator by liquid flow through pressure line 174. These pressure fluctuations otherwise would cause rapid and substantially continuous movement of the diaphragm and measurement indicating mechanism, and this would injure or shorten the service life of the indicator. The seal pot 170 also serves to isolate the pressure chamber of indicator 10 containing the diaphragm follower assembly and other measurement indicating elements from the line fluid, which is of particular advantage where the line fluid is a corrosive gas or has entrained therein materials which might clog up or otherwise interfere with operation of the indicator.

It will be apparent from the foregoing that the differential pressure devices and systems of my invention present many advantages over prior devices and systems, chief among which advantages are improved accuracy of measurement, facility of calibration, minimum pressure fluid seals about moving parts, simplicity of structure and economy of manufacture.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An adjustable biasing spring assembly for use in adjustably connecting a coil spring between two relatively movable members, comprising: a first means connecting one end of said spring to one of said members, a second means connecting the opposite end of said spring to the other of said members, one of said means comprising an adjustably threaded connection to its associated member and the other of said means comprising an adjustably threaded connection with one end of said spring, the other end of said spring having a relatively non-rotatable connection with the one of said means not threadedly connected to its said one end, the lead and direction of turn of both said threaded connections being the same, so that a single adjustment operation of said one means results in a concurrent similar degree of change of relative position of each end of said spring relative to its respective movable member.

2. An adjustable biasing spring assembly as defined in claim 1, wherein said one of said means which comprises a threaded connection to its associated member includes means for releasably clamping its threaded connection.

3. An adjustable spring biasing assembly as defined in claim 1, wherein said one of said means which comprises a threaded connection to its associated member includes a rod having a threaded end, two ring members threaded on said threaded end and non-rotatably fixed relative to the associated member so said two ring members are spaced apart, means preventing axial movement of one of said ring members, and means to selectively exert a force on and tending to axially shift the other of said ring members toward said one ring member.

4. For use in an adjustable spring biasing assembly as defined in claim 1, wherein said one of said means which comprises a threaded connection to its associated member is a rod having a threaded end; and two ring members threaded for attachment to said threaded end, each ring member having means adapted to cooperate with a common fixed structure to non-rotatably maintain said ring members relative to each other and to permit relative axial shifting of said two ring members.

5. A pressure device comprising: a casing; a flexible diaphragm secured around its outer edge to said casing to form therewith separate fluid pressure chambers at opposite sides of the diaphragm, said diaphragm being movable in response to differentials of pressure between said chambers; a substantially central aperture in said diaphragm; means closing said central aperture comprising an elongated thimble assembly upstanding within said casing, open at one end through said diaphragm aperture and closed at the other end; a support rod member carried at one end by said casing and projecting through the open end of said thimble assembly toward the closed end thereof; a coil spring in said thimble assembly; means connecting said spring adjacent one end thereof to said thimble assembly adjacent its open end; and means connecting said spring adjacent the other end thereof to said support rod adjacent its free end, whereby the spring effectively opposes movement of said diaphragm away from its zero position.

6. The pressure device defined in claim 5, wherein said thimble assembly and diaphragm are freely suspended in said casing, and said means interconnecting the spring and support rod comprise pivot and pivot socket means permitting self-alignment of said support rod, spring and thimble assembly for maximum freedom of movement thereof.

7. The pressure device defined in claim 5, including adjustment means for varying the effective length of the biasing spring and thus varying distance of travel of the diaphragm per unit pressure differential applied.

8. The pressure device defined in claim 7 wherein said adjustment means comprises a first threaded connection at one of said spring end connections and a second threaded connection between said support rod member and said casing, said threaded connections being simultaneously adjustable and of hand such that as said first threaded connection is adjusted to vary its point of connection to said spring and thus vary the effective length thereof the second is adjusted to shift the position of the support rod member in a direction such that the zero position and zero position tension of the spring remain substantially unchanged by the adjustment in effective length thereof.

9. For use in a pressure sensitive device having a casing with a movable internal wall member defining separate fluid pressure chambers at opposite sides thereof and movable in response to differentials of pressure between said chambers, adjustable wall member biasing means comprising: a biasing spring urging said movable wall member toward one of said chambers; means operatively connecting said spring adjacent its opposite end to said movable wall member, at least one of said spring connection means being adjustable to vary its point of connection to said spring to thus vary the effective length thereof to obtain desired distance of travel of the diaphragm with unit pressure differential applied, and at least one of said spring connection means being adjustable to vary the longitudinal position of the respective spring end in relation to said casing simultaneously with adjustment of spring effective length whereby a zero position of said movable wall member and zero position tension of said biasing spring remain substantially unchanged by adjustment of its effective length; said means for operatively connecting the biasing spring to the casing comprising a support rod member having one end operatively connected to the biasing spring and its other end operatively connected to a member adapted to be secured to the casing; there being a fixed connection of one end of the biasing spring to one of said movable wall and support rod members, a first threaded connection between the other end of the biasing spring and the other of said members and a second threaded connection of said support rod member to said member adapted to be secured to said casing whereby on rotation of the support rod member the first threaded connection is adjusted to vary its point of connection to the biasing spring and thus vary the effective length thereof and the second threaded connection is simultaneously adjusted to shift the support rod axially within the casing in a direction and to an extent such that the zero position of biasing spring remains substantially unchanged by the change in effective length thereof.

10. The adjustable biasing means as defined in claim 9, wherein said first threaded connection is of said movable wall member to the biasing spring and comprises a thread formed in said wall member, said biasing spring being a coil spring having coils of pitch length and diameter such as to enable the spring to directly engage in said wall member thread.

11. The adjustable biasing means as defined in claim 10, wherein said wall member thread has a pitch·length differing slightly from that of said coil spring so that the spring is stressed on being turned into the wall member thread.

12. The adjustable biasing means as defined in claim 9, wherein said threaded connection of said support rod to said casing comprises an externally threaded member fixedly carried adjacent an end of said support rod, a pair of spaced axially aligned internally threaded bushings threadedly engaged with said threaded member and fixed against rotation in said casing, one of said bushings being also fixed against axial movement in said casing and the other free for axial movement, and locking means adjustable to move said free bushing in a direction to clamp the threads of the support rod between the threads of the bushings to thus lock the rod against rotation.

13. In a pressure sensitive device, a casing having mounted therein a movable wall member defining separate fluid pressure chambers at opposite sides thereof and movable responsive to differentials of pressure between said chambers, a biasing spring in one of said chambers for biasing said movable wall in the direction of one of said chambers, and means connecting said spring adjacent one end thereof to said movable wall member and adjacent the other end thereof to a spring support rod rotatable to adjust the effective length of the spring, means mounting said support rod to said casing including a threaded member fixedly carried by said support rod, a pair of spaced axially aligned bushings threadedly engaged with said threaded member and fixed against rotation in said casing, one of said bushings being also fixed against axial movement in said casing and the other free for limited axial movement, and locking means selectively adjustable to shift said free bushing axially to clamp the threads of the support rod between the threads of the bushings and lock the support rod against rotation or to free the rod for rotation to adjust the effective length of the biasing spring and simultaneously to shift the support rod axially to avoid substantial change in zero position of the movable wall member with change in effective length of the biasing spring therefor.

14. The pressure sensitive device defined in claim 13, wherein said locking means comprises a lock ring threadedly engaged in a bore in said casing adapted to receive a pressure line fitting therein for communicating line pressure to one of said fluid pressure chambers, said lock ring and support rod being accessible through said casing bore on removal of said line fitting.

15. In a pressure sensitive device, a casing, a movable wall member mounted in said casing and defining therewith separate fluid pressure chambers on opposite sides of said member, said member being movable in response to differentials of pressure between said chambers, a biasing spring in one of said chambers opposing movement of said member away from zero position, means forming an opening in said casing into one of said chambers adapted to receive a pressure line fitting therein for communicating line pressure to said one chamber, and means accessible through said opening for adjusting the setting of said biasing spring.

16. In a pressure sensitive device, a casing having a movable wall member defining fluid pressure isolated chambers on either side thereof and movable responsive to differentials of pressure between said chambers, a biasing spring in one of said chambers urging said movable wall member in the direction of one of said chambers, means connecting said spring adjacent one end thereof to said movable wall member and adjacent the other end thereof to a spring support rod, adjustable means on said support rod to vary the setting of said spring and adjustably carried at one end by said casing, an opening into said casing adjacent said one end of the support rod adapted to receive a pressure line fitting therein for communicating line pressure to said one chamber, and means for adjusting said spring support rod accessible through said casing opening on removal of said line fitting.

References Cited in the file of this patent
UNITED STATES PATENTS

| | | |
|---|---|---|
| 973,641 | Dysart | Oct. 25, 1910 |
| 1,804,599 | Edel | May 12, 1931 |
| 1,832,380 | Goldman | Nov. 17, 1931 |
| 1,958,503 | Wintzer | May 15, 1934 |
| 2,079,069 | Johnson | May 4, 1937 |
| 2,265,629 | Christiansen | Dec. 9, 1941 |
| 2,286,919 | MacNeill | June 16, 1942 |
| 2,475,894 | Hermanny | July 12, 1949 |
| 2,492,465 | Dahl | Dec. 27, 1949 |
| 2,585,362 | Willson | Feb. 12, 1952 |
| 2,651,328 | Gamble | Sept. 8, 1953 |